United States Patent
Perry et al.

(10) Patent No.: US 8,652,691 B1
(45) Date of Patent: Feb. 18, 2014

(54) PRE-OXIDATION OF METALLIC INTERCONNECTS

(75) Inventors: Martin Perry, Sunnyvale, CA (US); Matthias Gottmann, Sunnyvale, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 919 days.

(21) Appl. No.: 11/798,673

(22) Filed: May 16, 2007

Related U.S. Application Data

(60) Provisional application No. 60/816,878, filed on Jun. 28, 2006.

(51) Int. Cl.
  *H01M 8/00* (2006.01)
  *H01M 8/10* (2006.01)
  *H01M 8/24* (2006.01)

(52) U.S. Cl.
  USPC ............ 429/400; 429/465; 429/467; 429/468

(58) Field of Classification Search
  None
  See application file for complete search history.

(56) References Cited

U.S. PATENT DOCUMENTS

| 5,733,682 | A | 3/1998 | Quadakkers et al. |
| 5,942,349 | A * | 8/1999 | Badwal et al. ............... 429/495 |
| 7,390,456 | B2 | 6/2008 | Glatz et al. |
| 8,173,063 | B2 | 5/2012 | Zobl et al. |
| 2001/0044041 | A1 * | 11/2001 | Badding et al. ................ 429/32 |
| 2006/0096453 | A1 * | 5/2006 | Meacham ....................... 95/45 |

FOREIGN PATENT DOCUMENTS

| JP | 07-045289 A1 | 2/1995 |
| JP | H7-45291 A | 2/1995 |

* cited by examiner

*Primary Examiner* — Barbara Gilliam
*Assistant Examiner* — Adam A Arciero
(74) *Attorney, Agent, or Firm* — The Marbury Law Group PLLC

(57) ABSTRACT

A method of making a metal interconnect for an electrolytic cell stack includes oxidizing the metal interconnect prior to providing the oxidized metal interconnect into the electrolytic cell stack. A pre-oxidized metal interconnect for an electrolytic cell stack would not substantially further oxidize upon exposure to a subsequent oxidizing ambient at a temperature of at least 900° C. prior to or after being provided into the electrolytic cell stack.

19 Claims, 3 Drawing Sheets

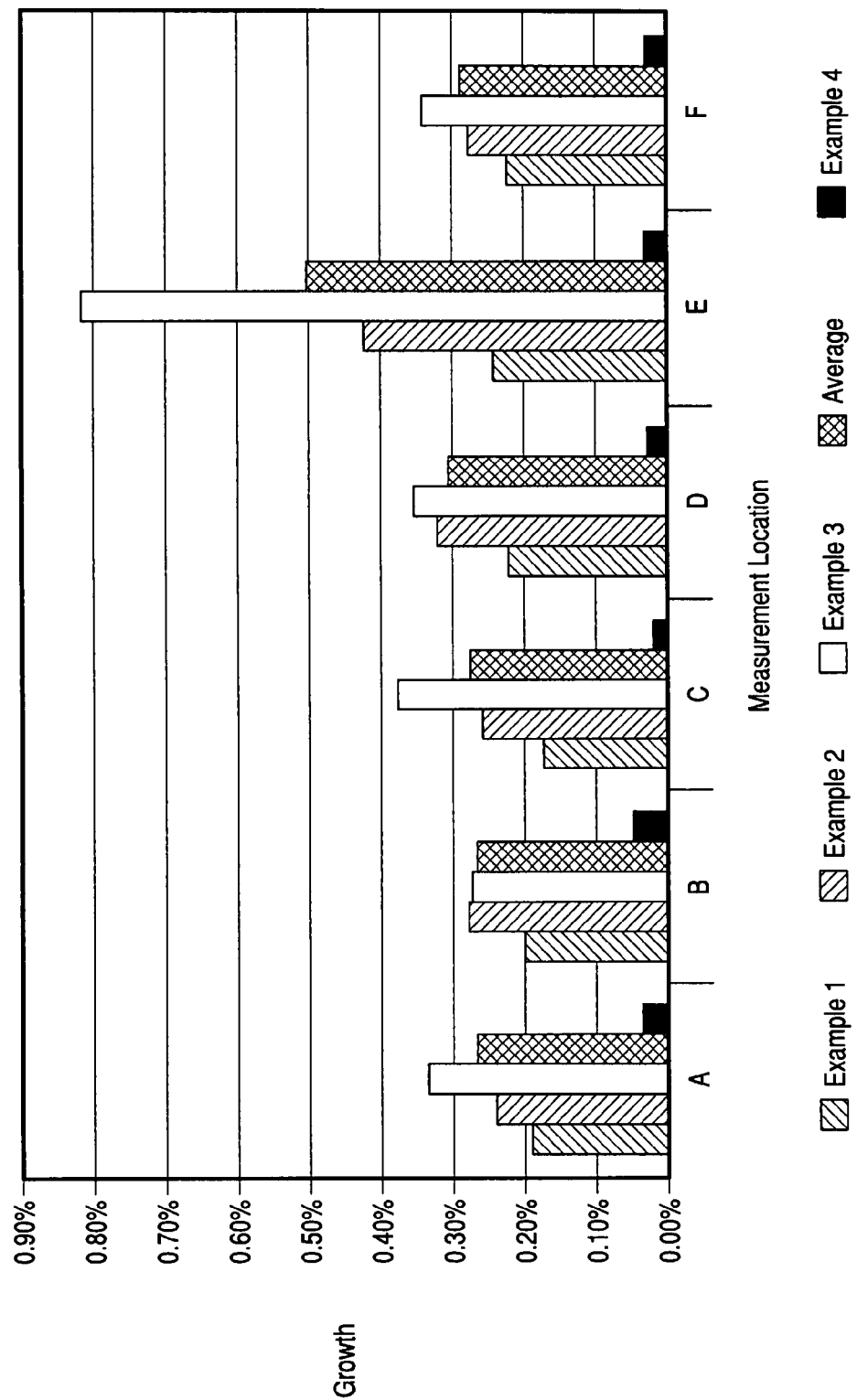

PRE-OXIDATION OF METALLIC INTERCONNECTS

BACKGROUND OF THE INVENTION

The present invention is generally directed to electrolytic cell systems and more specifically to metallic interconnects used in fuel cell systems.

Electrolytic cells may operate as fuel cells or electrolyzer cells. Fuel cells are electrochemical devices which can convert energy stored in fuels to electrical energy with high efficiencies. Electrolyzer cells are electrochemical devices which use electrical energy to convert a material, such as water, to fuel, such as hydrogen. Reversible fuel cells sequentially operate in both the fuel cell and electrolysis modes. One type of high temperature fuel cell is a solid oxide fuel cell which contains a ceramic (i.e., a solid oxide) electrolyte, such as a yttria stabilized zirconia (YSZ) electrolyte. A solid oxide reversible fuel cell operates in both the fuel cell and electrolysis modes. Other high temperature fuel cells include, for example, molten carbonate fuel cells.

One component a planar solid oxide fuel cell stack or system is the so called gas separator plate that separates the individual cells in the stack. The gas separator plate separates fuel, such as hydrogen or a hydrocarbon fuel, flowing to the anode electrode (i.e., fuel electrode) of one cell in the stack from oxidant, such as air, flowing to a cathode electrode (i.e., oxidant electrode) of an adjacent cell in the stack.

Frequently, the gas separator plate is also used as an interconnect which electrically connects the anode electrode of one cell to a cathode electrode of the adjacent cell. In this case, the gas separator plate which functions as an interconnect is made of an electrically conductive material, such as a chromium-iron-yttrium alloy. Such metal alloy plates are often made by powder metallurgy techniques, such as by pressing a starting material powder into a desired plate shape followed by sintering. In general, the gas separator/interconnect plate preferably has the following characteristics: it does not conduct ions, it is non-permeable to fuel and oxidant, it is chemically stable in both the fuel and oxidant environment over the entire operating temperature range, it does not contaminate either the electrodes or the electrolyte, it is compatible with they high temperature sealing system, it has a Coefficient of Thermal Expansion (CTE) that closely matches that of the selected electrolyte, and it has a configuration that lends itself to low cost at high volumes.

Metallic interconnects, especially those made through pressing of a powder often suffer dimensional distortions during exposure to air at high temperatures. A major portion of these distortions is attributed to oxidation of the metal. It is believed that the extent of the distortion or dimensional instability is a direct function of the density of the part that has been pressed and sintered. These dimensional distortions can be large enough to affect the integrity of electrolytic cells (such as fuel cells and/or electrolyzer cells).

BRIEF SUMMARY OF THE INVENTION

One embodiment of the present invention provides a method of making a metal interconnect for an electrolytic cell stack, comprising oxidizing the metal interconnect prior to providing the oxidized metal interconnect into the electrolytic cell stack.

BRIEF DESCRIPTION OF THE DRAWINGS

FIG. 3 is a plot of a change in length and width of the part (in percent) after oxidation versus measurement location on the interconnect for interconnects of the specific examples of the present invention.

DESCRIPTION OF THE EMBODIMENTS

The present inventors observed that the cells crack during the initial operation of a cell stack, such as during the initial heat up and during preliminary conditioning of a stack with metallic interconnects. The present inventors realized that this damage to the cells can be reduced or prevented by exposing the interconnects to an oxidizing ambient, such as air at high temperature, prior to use of the interconnect in the stack. The high temperature air exposure causes oxide formation and the associated geometric distortion prior to the attachment of the seals and the interconnect to the cells, such as to the electrolyte and/or the electrodes of the cells. During subsequent heat-ups, less (or negligible) distortion due to oxidation occurs and the stresses on the cells are greatly reduced compared to stacks containing non-preoxidized interconnects.

The pre-oxidized interconnect may be used in any suitable electrolytic cell system, such as in a fuel cell system, an electrolyzer system or a reversible fuel cell system. Preferably, the system comprises a high temperature system, such as a high temperature fuel cell system. For example, the high temperature fuel cell system may comprise a solid oxide fuel cell stack. However, other high temperature systems, such as molten carbonate fuel cell stacks may be used instead.

Figure 1:
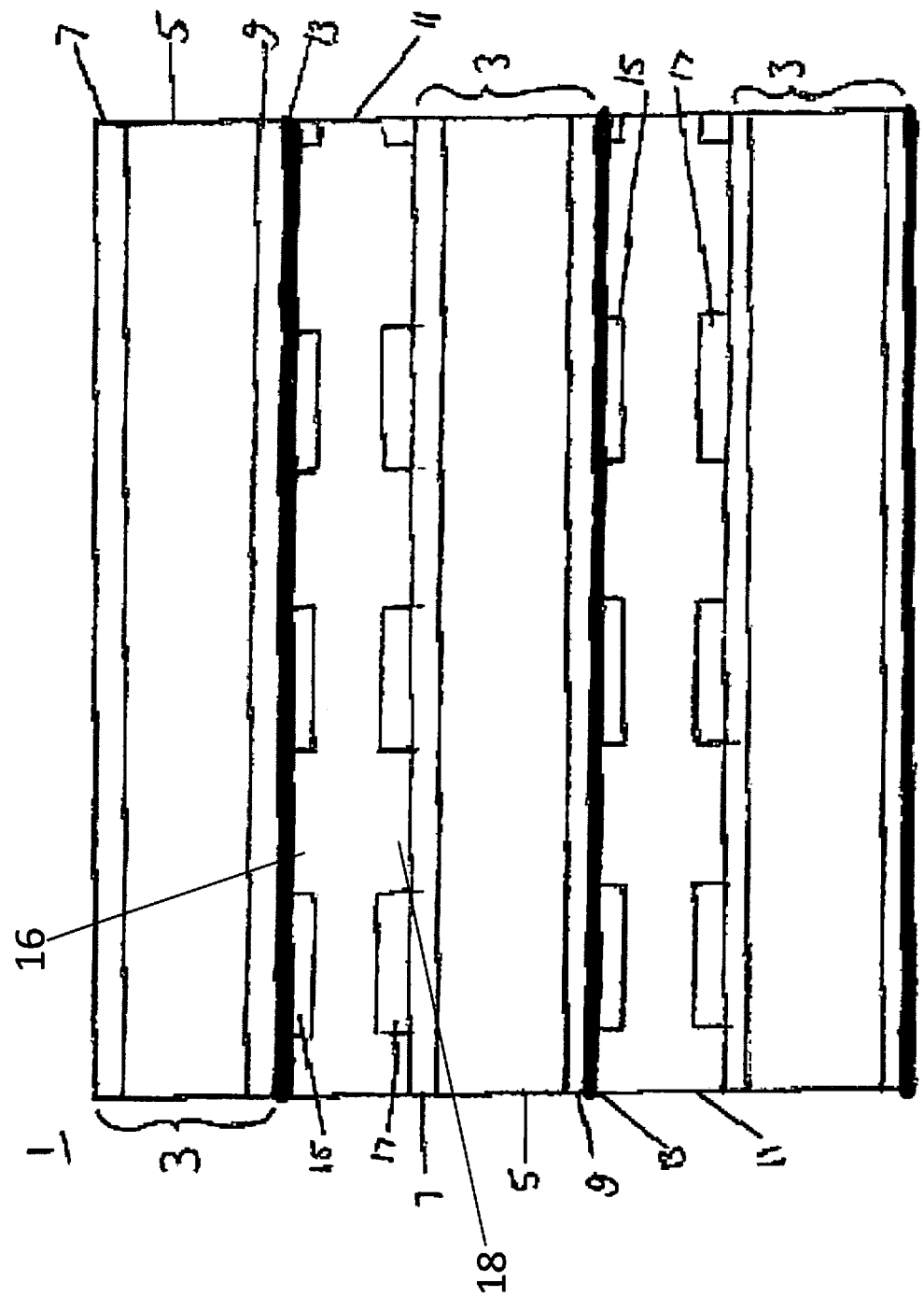
FIG. 1 is a side cross sectional view of an electrolytic cell stack according to one embodiment of the invention.

FIG. 1 schematically illustrates a solid oxide fuel cell stack 1 according to an embodiment of the invention. The stack includes a plurality of fuel cells 3, each of which includes an electrolyte 5 located between anode 7 and cathode 9 electrodes, and a plurality of interconnect/gas separator plates 11 located between and separating adjacent fuel cells 3. Thus, each gas separator plate 11 is also used as an interconnect which electrically connects the anode electrode 7 of one cell 3 to a cathode electrode 9 of the adjacent cell. The interconnect is made of an electrically conductive material, such as a metal alloy.

Any suitable materials may be used in the stack. For example, the electrolyte 5 may comprise a stabilized zirconia, such as a yttria or scandia stabilized zirconia or another ionically conductive oxide material, alone or in combination with the zirconia. The anode electrode 7 may comprise a cermet, such as a cermet containing nickel and one or both of a doped ceria and a doped zirconia, such gadolinia doped ceria, yttria stabilized zirconia and/or scandia stabilized zirconia. The cathode electrode 9 may comprise an electrically conductive ceramic material, such as lanthanum strontium manganite (LSM) having a formula $(La,Sr)MnO_3$ or lanthanum strontium cobaltite ("LSCo") having a formula $(La,Sr)CoO_3$ or other conductive perovskite materials.

For solid oxide fuel cell stacks, the interconnect 11 preferably comprises a chromium alloy, such as a Cr—Fe—Y alloy made by powder metallurgy techniques, such as by pressing and sintering a Cr—Fe—Y powder. The alloy preferably comprises 4 to 6 weight percent iron, such as 4.5 to 5.5 weight percent Fe, and 1 weight percent or less yttrium, such as 200 to 2000 micrograms/gram of Y, with the balance comprising chromium and residual or unavoidable impurities. The impurities may be absent or may include one or more of O, H, Al, Si, N and/or C in a total amount of less than 1 weight percent.

Other metals and metal alloys which have the desired properties for particular electrolytic cell materials may also be used.

The stack 1 may also contain an optional anode and/or cathode contact materials. For example, FIG. 1 illustrates a cathode contact material 13 which is located between the interconnect plate 11 and the cathode electrode 9 of an adjacent fuel cell 3. If desired, an anode contact material may be located between the interconnect plate and the anode electrode of an adjacent fuel cell. The contact material may comprise a metallic felt, layer or mesh, an electrically conductive glass or an electrically conductive ceramic felt. For example, the anode and/or cathode contact materials may comprise a nickel felt or mesh.

The interconnect plate 11 preferably contains gas flow grooves 15, 17 located in the major surfaces of the plate 11 facing the anode and cathode electrodes of adjacent cells. As can been seen in FIG. 1, the grooves 15 on the cathode side of the interconnect 11 are separated from each other by ribs 16 and the grooves 17 on the anode side of the interconnect 11 are separated from each other by ribs 18. The grooves may be parallel to each other as shown in FIG. 1. Alternatively, the grooves may be perpendicular to each other for cross gas flow on opposite sides of the gas separator plate. Of course, the grooves may extend in any direction between parallel and perpendicular from each other if desired.

It should be noted that the stack 1 shown in FIG. 1, may be oriented upside down or sideways from the exemplary orientation shown in FIG. 1. Furthermore, the thickness of the components of the stack 1 is not drawn to scale or in actual proportion to each other, but is magnified for clarity. Furthermore, the stack may contain other components such as seals, fuel and air riser openings or inlets, which are not shown in FIG. 1 for clarity.

A method of making the interconnect for an electrolytic cell stack, such as a fuel cell stack, includes oxidizing a metal interconnect prior to providing the oxidized metal interconnect into the electrolytic cell stack. The pre-oxidized interconnect comprises a free standing interconnect that has not been incorporated the electrolytic cell stack. The interconnect is then provided into an electrolytic cell stack, such as a fuel cell stack, after the step of oxidizing. The interconnect is located between two fuel cells in the fuel cell stack and the interconnect electrically connects the two fuel cells to each other.

At least one dimension of the metal interconnect changes during the step of oxidizing. Preferably, one or more dimensions of the interconnect increase after the oxidation step. For example, for a plate shaped interconnect (i.e., an interconnect having a thickness which is at least one order of magnitude smaller than its width or length), the thickness of the interconnect increases by at least 0.02%, such as by about 0.1% to about 0.9%, after the step of oxidation. Thus, at least the surface portions of the interconnect are oxidized to form a metal oxide. For a Cr—Fe—Y interconnect, the oxidation forms a chromium and/or iron oxide on at least the surface of the interconnect.

In general, the oxidation is conducted for a sufficient time such that the interconnect does not substantially further oxidize after it is provided into the stack and exposed to an oxidizing ambient during stack operation. In other words, the interconnect is oxidized to at least 99% of its maximum possible oxidation amount during the oxidation step. Thus, the preoxidized metal interconnect would not substantially further oxidize upon exposure to a subsequent oxidizing ambient at a temperature of at least 900° C. prior to or after being provided into the stack.

Preferably, the oxidation is conducted at an elevated temperature in an oxidizing ambient. For example, for a Cr—Fe—Y interconnect, the oxidation is conducted for at least about 18 to 22 hours at a temperature of at least 900° C. in air and/or in oxygen, such as for 20 to 200 hours, for example 168 hours, in air at a temperature of 950° C. Higher temperature, such as 951 to 1050° C., for example, may also be used. The minimum desirable oxidation duration such that the interconnect does not substantially further oxidize varies based on the oxidation temperature and other processing factors. Other temperatures and oxidation durations may be used for other interconnect materials. If desired, the oxidation step may be broken up into several sub-steps conducted at different temperatures and/or for different durations, if desired.

Preferably, the dimensions of the interconnect do not substantially change after the step of oxidation when the interconnect is exposed to a subsequent oxidizing ambient before or during stack operation (i.e., before or after being inserted into the stack). Thus, the interconnect dimensions change by less than 0.02% when it is exposed to a subsequent oxidizing ambient at an elevated temperature, such as at a temperature above 900° C. for at least 5 hours, such as for 20 to 168 hours. Therefore, the interconnect does not further substantially deform during the initial stack operation at an elevated temperature in an oxidizing ambient and does not damage the adjacent cells of the stack. In contrast, if the interconnect is not pre-oxidized before being inserted into the stack, then it will be subjected to the same deformation inside the stack during the initial stack operation at an elevated temperature in an oxidizing ambient. This deformation may cause damage to the adjacent cells of the stack.

The following examples are provided for illustration of the embodiments of the invention should not be considered to be limiting on the scope of the invention.

In examples 1-4, the Cr—Fe—Y interconnects were subjected to oxidation in air at an elevated temperature. The interconnect material comprised the Cr—Fe—Y alloy made by powder metallurgy techniques. The alloy is believed to have comprised 4.5 to 5.5 weight percent Fe, 200 to 2000 micrograms/gram of Y, with the balance comprising chromium and residual or unavoidable impurities.

In example 1, two interconnects were annealed for 168 hours at 950° C. in air. The interconnects were inserted into a furnace which was then ramped to 950° C. at a rate of 1.2° C. per minute. The interconnects were held at 950° C. for 168 hours and were then ramped down to room temperature at a rate of 1.2° C. per minute. In examples 2, 3 and 4, other interconnects were annealed for 168 hours at 950° C. in air using the same temperature ramping procedure as described above.

Figure 2:
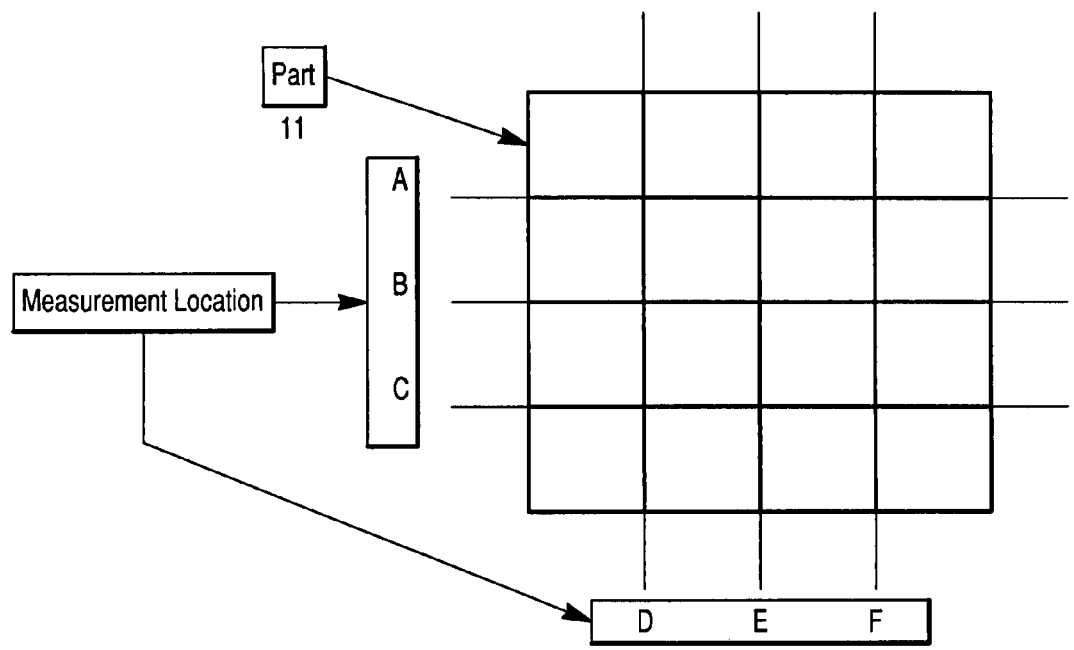
FIG. 2 is top schematic view of an interconnect showing the measurement locations for the data shown in Table 1 and in FIG. 3.

As illustrated in FIG. 2, the change in length and width of each interconnect was then measured at six different locations A-F on the interconnect by measuring the interconnect length and width at these locations before and after the oxidation. The change in length and width at each location is summarized in Table 1 below.

TABLE 1

| | Measurement Location | | | | | |
|---|---|---|---|---|---|---|
| | A | B | C | D | E | F |
| Example 1 (Two Parts) | 0.19% | 0.20% | 0.17% | 0.22% | 0.24% | 0.22% |
| Example 2 | 0.24% | 0.28% | 0.25% | 0.32% | 0.42% | 0.27% |
| Example 3 | 0.34% | 0.27% | 0.38% | 0.35% | 0.81% | 0.34% |
| Example 4 | 0.04% | 0.05% | 0.02% | 0.03% | 0.03% | 0.03% |
| Average | 0.27% | 0.27% | 0.27% | 0.31% | 0.50% | 0.29% |

FIG. 3 graphically illustrates the change in interconnect length and width for each example after the oxidation that is shown numerically in Table I above. As can be seen from Table I and FIG. 3, the interconnect length and width increases by about 0.02% to about 0.81% with most measurements showing a length and width increase between about 0.2% and about 0.4% with an average length and width increase between about 0.27 to about 0.31% for most measurement locations.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

The invention claimed is:

1. A method of making a metal interconnect for an electrolytic cell stack, comprising;
    making the metal interconnect by a powder metallurgy technique which comprises pressing a powder and then sintering the powder; and
    oxidizing the metal interconnect made by the powder metallurgy technique at a temperature of at least 900° C. for at least 5 hours prior to providing the oxidized metal interconnect into the electrolytic cell stack,
    wherein the step of oxidizing is conducted at an elevated temperature in an oxidizing ambient and wherein the step of oxidizing is conducted for a sufficient time such that the interconnect does not substantially further oxidize after it is provided into the stack and exposed to an oxidizing ambient during stack operation, and
    wherein a length and a width of the interconnect increase by at least 0.02% during the step of oxidizing.

2. The method of claim 1, wherein the length and the width of the interconnect increase by about 0.1% to about 0.9%.

3. The method of claim 1, wherein dimensions of the interconnect do not substantially change when after the step of oxidizing, the interconnect is exposed to a subsequent oxidizing ambient before or during stack operation.

4. The method of claim 1, wherein the step of oxidizing is conducted at the temperature of at least 900° C. in air or oxygen.

5. The method of claim 1, further comprising providing the interconnect into a fuel cell stack after the step of oxidizing, such that the interconnect is located between two fuel cells in the fuel cell stack and electrically connects the two fuel cells to each other.

6. The method of claim 5, wherein the interconnect comprises a plate shaped interconnect which acts as a gas separator plate between the two fuel cells.

7. The method of claim 6, wherein the interconnect comprises a Cr—Fe—Y alloy and the two fuel cells comprise solid oxide fuel cells.

8. The method of claim 4, wherein the interconnect comprises a Cr—Fe—Y alloy.

9. The method of claim 1, wherein the interconnect comprises gas flow passages in opposing major surfaces of the interconnect.

10. The method of claim 1, wherein the interconnect is oxidized to at least 99% of its maximum possible oxidation amount during the oxidation step.

11. The method of claim 1, wherein the step of oxidizing is conducted at a temperature of 950° C. to 1050° C. for 20 to 200 hours.

12. The method of claim 1, further comprising providing the interconnect into a fuel cell stack after the step of oxidizing, such that the interconnect is located between two solid oxide fuel cells in the fuel cell stack and electrically connects the two fuel cells to each other;
    wherein:
    the interconnect comprises a plate shaped interconnect which acts as a gas separator plate between the two fuel cells;
    the interconnect comprises gas flow passages in opposing major surfaces of the interconnect;
    the interconnect comprises a chromium based alloy comprising a layer comprising chromium oxide formed during the step of oxidizing on a surface of the interconnect; and
    the layer comprising chromium oxide contacts a cathode electrode or a cathode contact material of one of the two solid oxide fuel cells.

13. The method of claim 12, wherein:
    the gas flow passages comprise grooves separated by ribs; and
    first portions of the layer comprising chromium oxide located on the ribs but not second portions of the layer comprising chromium oxide located in the grooves contact the cathode electrode or the cathode contact material of one of the two solid oxide fuel cells.

14. A method of making a metal interconnect for an electrolytic cell stack, comprising;
    making the metal interconnect by a powder metallurgy technique which comprises pressing a powder and then sintering the powder; and
    oxidizing the metal interconnect prior to providing the oxidized metal interconnect into the electrolytic cell stack,
    wherein the step of oxidizing is conducted at an elevated temperature of at least 900° C. in an oxidizing ambient and wherein the step of oxidizing is conducted for a sufficient time such that the interconnect does not substantially further oxidize after it is provided into the stack and exposed to an oxidizing ambient during stack operation, wherein the interconnect comprises a chromium iron alloy interconnect made by a powder metallurgy technique; and wherein a length and a width of the interconnect increase from about 0.02% to about 0.81% during the step of oxidizing.

15. The method of claim 14, further comprising providing the interconnect into a fuel cell stack after the step of oxidizing, such that the interconnect is located between two fuel cells in the fuel cell stack and electrically connects the two fuel cells to each other.

16. The method of claim 15, wherein the interconnect comprises a plate shaped interconnect which acts as a gas separator plate between the two fuel cells, and wherein the interconnect comprises a chromium iron alloy and the two fuel cells comprise solid oxide fuel cells.

17. The method of claim 14, wherein the interconnect comprises chromium iron alloy.

18. The method of claim 14, wherein the interconnect is oxidized to at least 99% of its maximum possible oxidation amount during the oxidation step.

19. The method of claim 14, wherein the step of oxidizing is conducted at a temperature of 950° C. to 1050° C. for 20 to 200 hours in air or oxygen.

* * * * *